Oct. 10, 1967  J. A. MORESI, JR., ET AL  3,346,781

ELECTROLYTIC CAPACITOR AND METHOD OF MAKING

Filed April 16, 1964

INVENTORS
Joseph A. Moresi, Jr.
Albert E. Scherr, III
BY Connolly and Hutz
ATTORNEYS

United States Patent Office 3,346,781
Patented Oct. 10, 1967

3,346,781
ELECTROLYTIC CAPACITOR AND
METHOD OF MAKING
Joseph A. Moresi, Jr., North Adams, and Albert E. Scherr III, Williamstown, Mass., assignors to Sprague Electric Company, North Adams, Mass., a corporation of Massachusetts
Filed Apr. 16, 1964, Ser. No. 360,350
5 Claims. (Cl. 317—230)

ABSTRACT OF THE DISCLOSURE

An extended foil electrode electrolytic capacitor with compressed turn ends joined by metal coatings over only a part of each end having as a working electrolyte an electrolyte introduced into the wound section to initially form the foil electrodes and the method of producing the capacitor.

This invention relates to low voltage electrolytic capacitors of high capacitance of the type used in computers. In particular this invention relates to aluminum electrolytic capacitors having a case size of around two to three inches diameter, and the method of assembling these capacitors.

Physically large aluminum electrolytic capacitors of low voltage and high capacitance are used particularly for transistorized computer power supply applications. It is important that these units which are to be operated at about six volts or less have a high reliability at high capacitance ratings as well as good life characteristics. Of particular importance are such characteristics as the equivalent series resistance (ESR) which is the sum of the resistances of the oxide dielectric, the electrolyte-spacer combination, and the foils and tabs; the self-inductance of the turns of the convolutely wound foils; and, change in impedance over a wide range of frequencies.

An object of this invention is to provide an electrolytic capacitor that is superior to the prior art in lower equivalent series resistance, lower inductance, and lower impedance.

It is another object of this invention to provide a novel aluminum electrolytic capacitor having superior characteristics and which is produced by a simplified process.

Another object of this invention is a novel method for "forming" (producing a dielectric oxide) the capacitor electrodes either anode or anode and cathode by a simplified process.

A further object of this invention is to provide a novel termination of the anode and cathode foils of an aluminum electrolytic capacitor to the capacitor terminals.

These and other objects of this invention will become more apparent upon consideration of the following description taken together with the accompanying drawings in which.

The convolutely wound capacitor section of anode and cathode foils and interspersed paper spacers is assembled by rolling in a conventional manner. The anode and cathode foils are of such a width that the winding of the section extends an edge of each foil beyond the lateral edges of the porous spacer material. One of the foils is extended at each of the two ends of the section so that the resultant section has one of the foils extending at each of the respective ends.

The termination of the anode and cathode foils to the capacitor terminals is attained by burying the respective anode and cathode foil extensions in a sprayed-on conductive material which simultaneously shorts the extended turns and secures the terminal to the turns, and consequently to the capacitance section. The conductive material is applied through a mask so that only a portion of the ends of the turns of foil are covered by the conductive material, thereby leaving the remainder of the end of the section uncovered and open.

The foils are then "formed" by impregnating the section with a suitable forming electrolyte through the open ends of the section. The previously unformed electrode foils are then subjected to a forming voltage to produce on the surfaces of the electrode foils a dielectric oxide. The forming takes place after the assembly of the convolutely wound section and the attachment of the terminations, and is conducted at a voltage greater than the desired rated voltage of the capacitor.

Figure 1:
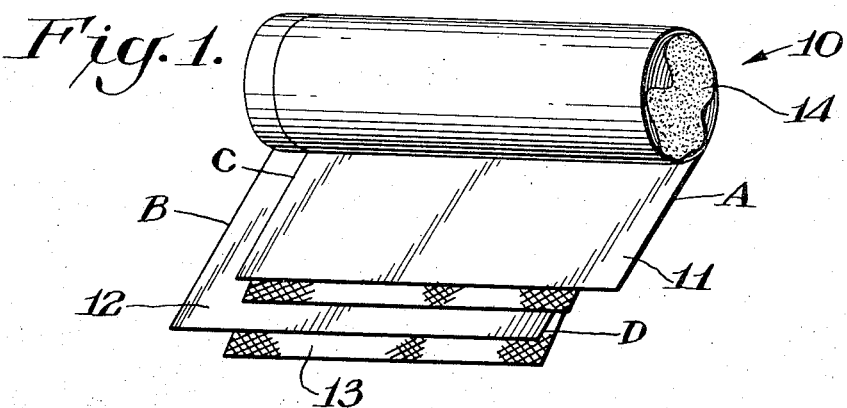
FIGURE 1 is a perspective view of a capacitance section according to this invention on a horizontal axis, and with the section partially unwound.
Figure 2:
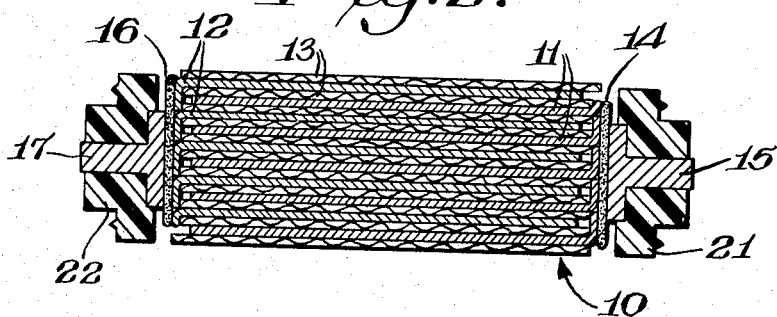
FIGURE 2 is an axial section view of the capacitor section showing the preferred termination of this invention; and, FIGURE 3 is an axial section of the preferred encasement of the capacitor section of FIGURE 2.

As shown in the drawings, capacitor section 10 of FIGURES 1 and 2 is a convolutely wound assembly of foil elements 11 and 12 and spacer elements 13. The capacitor section 10 is made up of convoluted layers of the pair of foil electrodes 11 and 12 between which are interposed the porous spacers 13 which are preferably composed of paper. In the convolutely wound section 10 the electrodes are wound on each other in extended-foil fashion with foil 12 extending from the left end of the section as seen in FIGURE 1 and the foil 11 extending from the right end, each forming a number of concentric turns of foil. Each of the overlapping concentric turns of foil is separated from adjacent turns by the paper spacers 13. There are two paper spacers 13, each separating a pair of sides of the foils 11 and 12.

The wound capacitance section 10 is shown with the axis extending horizontally in FIGURE 1. Thus, the width of the component parts is along this horizontal axial dimension. It is seen that one edge of electrodes 11 and 12 extends beyond the paper spacers 13 at the respective sides of the section 10. An out edge A of foil electrode 11 forms the outer edge of the turns of the right end as seen in FIGURE 1 and an out edge B of foil electrode 12 forms the outer edge of the turns of the left end. The in edge C of the foil 11 is inside the section 10, as is the in edge D of the foil 12.

FIGURE 2 is a section showing the wound layers of electrodes and spacers with the outedges A and B extending beyond the paper spacers 13 at the respective ends of the section 10. The edges A and B are each compressed so that the convolutions of the respective electrodes 11 and 12 are in contact. These edges A and B are then partially covered by a conductive material 14 and 16 respectively, preferably the same material and purity as the foils, as by a metal spray applied through a mask, so as to provide a common conductor at each of the respective ends of section 10.

In FIGURE 2 the foil electrode 11 is shown with the edge A having a conductive material 14 directly interconnecting the turns. A metallic stud 15 encased in resin plug 21 is attached to the conductive strip 14. FIGURE 2 also shows conductive material 16 interconnecting the turns of electrode 12, with a metallic stud 17 encased in resin plug 22 embedded in the material 16 for termination of the capacitor.

It will be understood that access to the interleaved layers of foil remains open even after the application of the conductive members 14, 16 and studs 15, 17. Although section 10 is tightly wound and compact the nature of porous spacers 13 permits ready penetration of the interior of the section by the capacitor electrolyte. Thus, the electrolyte can be introduced along the surfaces of the foil electrodes 11 and 12 and spacers 13 to completely wet the foil surfaces. A feature of this invention is the use of the "formation" electrolyte as the actual working electrolyte.

According to this invention the foil electrodes 11 and 12, preferably of aluminum although other valve-metals are within the scope of this invention, are wound into the section 10 in bare or unformed condition. That is, the surfaces of the electrodes do not carry the dielectric oxide, aluminum oxide, which is the dielectric of aluminum electrolytic capacitors. It will be understood that the pure aluminum surface of the unformed foils provides a superior surface for the attachment of the conductive aluminum strips 14 and 16. The good electrical and mechanical junction required for noise-free operation at low voltages is attained in this way.

It is necessary, however, to have a dielectric film on the aluminum electrode surfaces for the section to function as an electrolytic capacitor. This is formed by the anodization of the aluminum with a suitable electrolyte, preferably the glycol-borate or glycol-formate electrolyte known to the art as advantageous working electrolytes for low voltage aluminum electrolytic capacitors. The electrolyte is impregnated into the section which is then placed under a forming voltage which is roughly twice the rated voltage of the capacitor. This impregnation and forming step follows the step of applying the conductive strips 14, 16 and the studs 15, 17. This forming is particularly effective in producing an aluminum oxide dielectric which will be satisfactory for the voltages in the six volts or less range normally demanded of low voltage aluminum electrolytic capacitors employed in computer power supplies. It will be understood that while the structure of this invention is operable over a wide voltage range, the synergistic combination of structure and in situ formation is best experienced in the aforementioned six volts or less range wherein complete formation of a stable dielectric oxide is assured.

This invention is particularly advantageous in providing a low voltage aluminum electrolytic capacitor with the aforementioned superior electrical characteristics. The aluminum electrolytic capacitor of this invention has lower equivalent series resistance, lower inductance, and lower impedance changes over a wider range of frequencies than previously known low voltage-high capacitance aluminum electrolytic capacitors.

The above-described embodiment has illustrated the shorting of the turns and the application of the conductive strips by spraying with molten conductive materials such as aluminum. For example, the strip may be attached by brazing, welding, or soldering, or by a conductive resin. Known cold welding techniques may also be used. These techniques for shorting the turns and attaching the leads all are so adapted as to leave a substantial portion of the ends of the section open for impregnation with the electrolyte.

Figure 3:
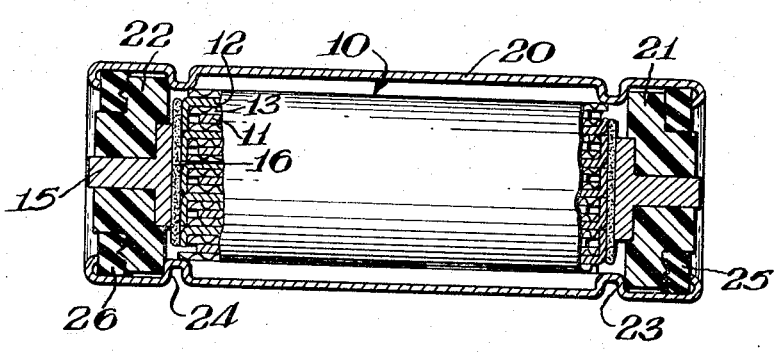

The electrolytic capacitor is preferably completed in the manner shown in FIGURE 3 as by inserting the formed section 10 into a tubular metallic housing 20 and then sealing the housing around plugs 21 and 22 by metal-working procedures known to the art. Crimps 23 and 24 are produced to provide seats against which the rolling of rim of housing 20 onto resilient rings 25 and 26 is accomplished. The "formation" electrolyte remaining within the section is all the electrolyte that is necessary for the operation of the capacitor at rated voltage.

While the above-described embodiment illustrates a capacitor design employing axial leads this invention is not limited to such a construction but is equally applicable to single ended constructions in which the two leads out at the same end of the capacitor. It also may be embodied in a feed-through design. Accordingly, it is intended that this invention be limited only by the scope of the appended claims.

What is claimed is:

1. An electrolytic capacitor comprising a convolutely wound capacitor section having a pair of aluminum foil electrodes separated by porous spaces, each of said electrodes having convoluted edges extending from one respective end of said section, each of said edges respectively being bent over and interconnected into a common terminal for the respective electrode, each of said bent over edges extending from the convolute edges of the opposite ends of the section, a first conductive metal coating covering substantially the entire bent over edges of a first of said electrodes and having passages for permitting flow of electrolyte between said bent over edges into and out of said section, and an electrical terminal connected to said coating, a second conductive metal coating covering substantially the entire bent over edges of a second of said electrodes and having passages for permitting flow of electrolyte between said bent over edges into and out of said section, and an electrical terminal connected to said coating, the extended bent over foil edges being interconnected at the respective ends by the respective first and second metal coatings, each of said bent over edges, coatings and terminals providing through passageways into the convolute layers of said section for circulation of electrolyte and an electrolyte impregnating said section, an in situ formed dielectric aluminum oxide on at least one of said electrodes, said electrolyte being retained within said section.

2. The method of producing an electrolytic capacitor comprising winding unformed aluminum electrodes and interleaved porous spacers into a convolutely wound capacitor section with a porous spacer adjacent to the electrode in the section and extending an edge of said electrode from one end of said section, bending the convolutions at each end of the respective extended edge over the end of the section while providing passages therebetween, covering substantially the entire bent over edges with a conductive metal coating and forming passages therebetween for flow of electrolyte into and out of said section, attaching a conductive electrical terminal to the metal coating and impregnating an electrolyte into said section between the bent over edges and through the passages in said metal coating, electrolytically forming at least one of the aluminum electrodes with the impregnated electrolyte, and placing the section in a container.

3. The method of claim 2 wherein the conductive metal coating is sprayed on a portion of the compressed convolutions.

4. The method of claim 2 wherein the aluminum electrode is electrolytically formed during and simultaneously with the circulation of electrolyte into the windings through the terminals.

5. In the method of claim 2 sealing the container and retaining the electrolyte in the section as a working electrolyte.

References Cited
UNITED STATES PATENTS

| | | | |
|---|---|---|---|
| 2,094,048 | 9/1937 | Siegel | 317—230 |
| 2,290,163 | 7/1942 | Brennan | 317—230 |
| 2,493,231 | 1/1950 | DeLange | 317—260 |
| 3,100,857 | 8/1963 | Rice et al. | 317—260 |
| 3,143,692 | 8/1964 | Terry | 317—260 |
| 3,174,085 | 3/1965 | Schroeder et al. | 317—230 |
| 3,256,472 | 6/1966 | Centurioni | 317—260 |

JAMES D. KALLAM, *Primary Examiner.*

UNITED STATES PATENT OFFICE
CERTIFICATE OF CORRECTION

Patent No. 3,346,781            October 10, 1967

Joseph A. Moresi, Jr., et al.

It is hereby certified that error appears in the above numbered patent requiring correction and that the said Letters Patent should read as corrected below.

Column 4, line 1, after "leads" insert -- extend --; line 9, for "spaces" read -- spacers --.

Signed and sealed this 29th day of October 1968.

(SEAL)
Attest:

Edward M. Fletcher, Jr.            EDWARD J. BRENNER
Attesting Officer                Commissioner of Patents